United States Patent [19]
Sproston et al.

[11] Patent Number: 5,417,314
[45] Date of Patent: May 23, 1995

[54] ELECTRORHEOLOGICAL FLUID DAMPER

[75] Inventors: John L. Sproston, Merseyside; Roger Stanway, Wilmslow, both of England

[73] Assignee: University of Liverpool, United Kingdom

[21] Appl. No.: 253,228

[22] Filed: Jun. 2, 1994

Related U.S. Application Data

[63] Continuation of Ser. No. 116,731, Sep. 7, 1993, abandoned, which is a continuation of Ser. No. 985,228, Dec. 2, 1992, abandoned, which is a continuation of Ser. No. 936,323, Aug. 28, 1992, abandoned, which is a continuation of Ser. No. 695,816, May 7, 1991, abandoned.

[30] Foreign Application Priority Data

May 17, 1990 [GB] United Kingdom ............... 9011108
Jul. 2, 1990 [GB] United Kingdom ............... 9014650

[51] Int. Cl.6 ............................................. F16F 9/53
[52] U.S. Cl. ................................. 188/267; 137/909
[58] Field of Search ............... 137/909; 188/267, 299, 188/322.22; 251/129.2; 267/140.11, 140.15, 218, 219, 140.14

[56] References Cited

U.S. PATENT DOCUMENTS

| | | | |
|---|---|---|---|
| 4,687,589 | 8/1987 | Block et al. | 252/74 X |
| 4,765,600 | 8/1988 | Härtel | 267/140.1 E X |
| 4,772,407 | 9/1988 | Carlson | 252/74 |
| 4,773,632 | 9/1988 | Härtel | 267/140.1 E |
| 4,861,006 | 8/1989 | Takano et al. | 188/267 X |
| 4,923,057 | 5/1990 | Carlson et al. | 188/267 X |
| 4,973,031 | 11/1990 | Takano et al. | 188/267 X |
| 4,994,198 | 2/1991 | Chung | 252/78.3 |
| 5,029,677 | 7/1991 | Mitsui | 188/322.22 X |
| 5,029,823 | 7/1991 | Hodgson et al. | 267/219 X |
| 5,060,919 | 10/1991 | Takano et al. | 248/562 X |
| 5,076,403 | 12/1991 | Mitsui | 188/267 |

FOREIGN PATENT DOCUMENTS

| | | | |
|---|---|---|---|
| 222350 | 5/1987 | European Pat. Off. | 188/267 |
| 315416 | 5/1989 | European Pat. Off. | 188/267 |
| 247835 | 10/1989 | Japan | 188/267 |
| 2205920 | 12/1988 | United Kingdom | 188/267 |

*Primary Examiner*—Robert J. Oberleitner
*Assistant Examiner*—Alfred Muratori
*Attorney, Agent, or Firm*—Cushman, Darby & Cushman

[57] ABSTRACT

An electrorheological device capable of containing an electrorheological fluid between two electrodes and having members for applying an electrical potential between the electrodes, characterised in that the device has members for subjecting the fluid to varying compressive or tensile stress in operation.

30 Claims, 4 Drawing Sheets

COMPRESSIVE STRESS kPa

COMPRESSIVE STRESS kPa

ELECTRORHEOLOGICAL FLUID DAMPER

This is a continuation of application Ser. No. 08/116,731, filed on Sep. 7, 1993 which was abandoned upon the filing hereof which was a continuation of Ser. No. 07/985,228 filed Dec. 2, 1992 now abandoned, which was a continuation of Ser. No. 07/695,816 filed May 7, 1991 now abandoned.

The present invention relates to electrorheological fluid apparatus (ER), that is, apparatus which relies for its operation on the electrorheological (ER) effect. (The ER effect is that phenomenon in which a large increase in the resistance to deformation or to flow of certain types of fluid particulate suspensions in a liquid [so-called electrorheological (ER) fluids], showing as a large increase in the apparent viscosity of the fluid, in some cases to virtual solidification, may be effected by an electric field applied to the fluid.)

ER apparatus is generally known, and interest in the industrial utilisation of such fluids and apparatus has grown at a colossal and accelerating rate during the last decade. There have been numerous world-wide predictions and speculations about suitable industrial applications of and the likely commercial prospects for ER fluids, and associated claims concerning their ultimate strength in mechanical systems.

Examples include apparatus for the transmission of force by the solidified fluid, such as the transmission of torque in an ER clutch against conventional shear stress between driving and driven surfaces, and vibration control apparatus in which valves are closed by a solidified plug of fluid against the conventional shear stress of hydrodynamic pressure on the solid plug, such as an ER damper using ER fluid valves. Such apparatus is speculatively for use in eg heavy-duty automotive or industrial applications.

Hitherto however, it has generally been concluded (rather disappointingly) that ER fluids may not be suitable for such heavy-duty applications. This has arisen generally because:

i) such a fluid is utilised in conventional shear configuration, and
ii) the conventional fluid shear strength is inadequate at moderate applied potential gradients, ie such fluids generally have a relatively low conventional static yield or dynamic shear stress to field intensity ratio,
ii) the fluid tends to have a relatively high d.c. conductivity,
iv) the fluid has an impractically large zero field viscosity,
v) high potential gradients applied to improve the inadequate mechanical strength of the fluid at lower field strengths coupled with the relatively high fluid d.c. conductivity results in undesirably high electrical power consumption, even increasing to impractical levels,
vi) electrical power consumption further increases to impractical levels with increasing fluid operating temperature, where such operating temperatures are typically elevated (eg in excess of 50° C.), owing to ambient conditions, and/or frictional heating or electrical energy and/or in the case of dampers absorbed mechanical energy being converted to heat,
vii) the fluid becomes constitutionally unstable at a relatively low electrical breakdown voltage with elevated temperatures, currents and/or the necessarily high applied potential gradients. In particular, the increase of electrical power consumption of ER fluids with temperature, leads in practical use to a continuing cycle of further power consumption and increased apparatus temperature.

In particular as regards point vii), an equilibrium temperature at which the applied potential is below the fluid breakdown voltage, may not be reached at an acceptable level of power consumption. If this does not occur below breakdown conditions for the fluid, d.c. conductivity and power consumption increases until the capacity of the power source is exceeded and/or the apparatus and/or the fluid fails.

Surprisingly, we have now found that improved mechanical strengths under an applied electrical field may be achieved by using an ER fluid predominantly under varying compression or tension, rather than in conventional shear.

Figure 1:
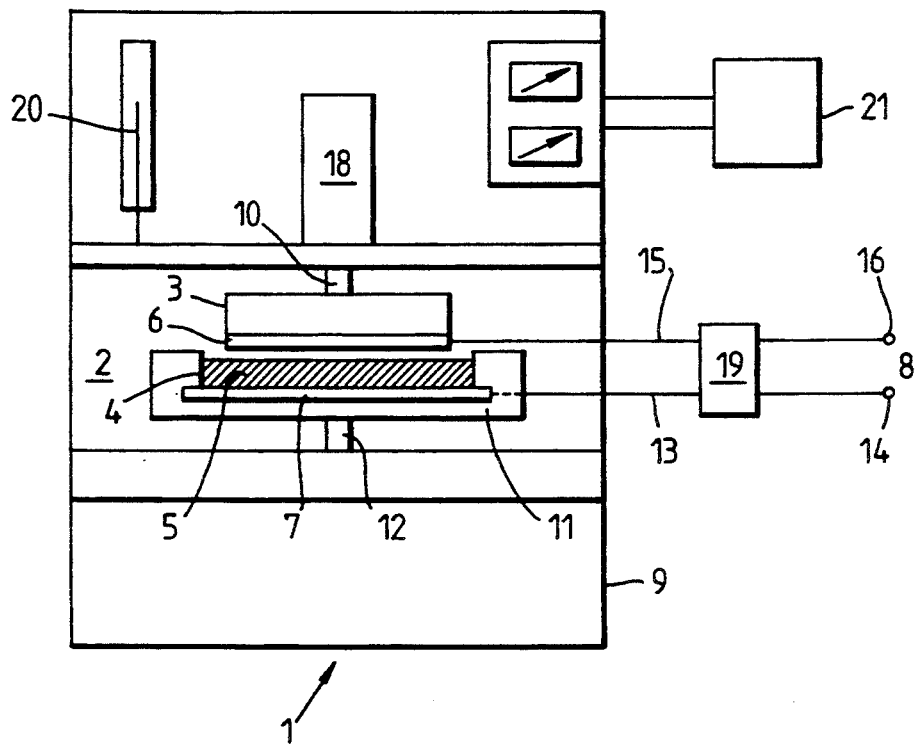
FIG. 1 is a cross-sectional view of a first embodiment of an electrorheological device of the present invention.

Accordingly, the present invention provides an electrorheological device capable of containing an electrorheological fluid between two electrodes and having means for applying an electrical potential between the electrodes, characterised in that the device has means for subjecting the fluid to varying compressive or tensile stress in operation.

In a simple form, such a device may be in the form of a piston and chamber in which the fluid may be squeezed out of and escape from or be admitted to the swept or dead volume within the chamber.

Thus, in one embodiment the present invention provides a device wherein the means for subjecting the fluid to varying compressive or tensile stress in operation comprises a chamber having an internal face, and a piston slidably mounted in the chamber towards and away from the chamber face and having a face opposed to the chamber face, whereby in use the electrorheological fluid in the chamber is sequentially squeezed from and admitted between the piston face and the chamber face.

It is often convenient for the chamber and piston to be cylindrical and for the piston and chamber faces to be planar and transverse to the piston traverse, in particular to be at right angles thereto.

In one form, such a device may be in the form of a dash-pot piston and chamber in which the fluid may be squeezed out of and escape from or be admitted to the swept or dead volume, with some braking effect, eg past the piston or through a narrow conduit in the chamber walls.

Thus, in a sub-embodiment the present invention provides a device in the form of a dash-pot wherein the means for subjecting the fluid to varying compressive or tensile stress in operation comprises a chamber having an internal face, and a piston slidably mounted in the chamber towards and away from the chamber face and having a face opposed to the chamber face, and the device also has transfer porting such that in use the electrorheological fluid in the chamber is sequentially squeezed from and admitted between the piston face and the chamber face through the transfer porting.

In one form of such a device the transfer porting is a narrow annular gap between the inner circumferential wall of the chamber about the axis of traverse of the piston and the circumferential face of the piston, whereby in operation of the device fluid may move past the piston.

In another form of the device the transfer Porting is a narrow conduit in the chamber wall communicating between the inside and the outside of the chamber.

Again, it is often convenient for the chamber and piston to be cylindrical, and for the piston and chamber faces to be planar and transverse to the piston traverse, in particular to be at right angles thereto.

In a device of the present invention, and in paricular in the specific embodiment of such a device described above, it may be convenient for the electrodes to form part of the means applying the tension or compression to the fluid (eg respectively as part of a piston face and a chamber end-wall transverse to the direction of motion of the piston).

There are numerous possibilities for the industrial exploitation of such a tensile or compressive stress of an ER fluid.

For example, it may be applied in an automotive suspension shock absorber or engine mount damper, where the direct loads which need to be supported are often larger than can be borne using an ER fluid in conventional shear (as noted hereinbefore). Such devices may now be designed to utilise ER fluids in direct compressive stress instead.

In the area of torque transmission, where the nature of the transmitted force inherently tends to constrain the use of fluids into operation in shear, the large torques required in say the automotive industry cannot yet be achieved using ER fluids in conventional shear, but may be achievable using the same or similar fluids in compression or tension to transmit rotary motion.

For example, a piston and chamber device as described above may form part of a connecting linkage or push-rod between a pair of cams, cranks, eccentrics or ratchets on two parallel shafts, such that reciprocating motion is only transmitted along the linkage or push-rod when the device is energised.

The present invention provides an order of magnitude greater ER stress for a given ER fluid than hitherto at the same applied electrical potential or field.

This offers the distinct possibility of a reduction in power consumption.

It also offers the distinct possibility of a concomitant reduction in electrical heat loss and (over)heating of ER fluids in use.

The present invention accordingly in a second aspect also provides a method of Use of an ER composition wherein the ER fluid is subjected to varying compressive or tensile stress, eg in a device of the present invention, such as a hydraulic damper.

The operational potential applied to the ER fluid in the apparatus of the present invention may conveniently be in the range of 1 to 20, eg 2 to 10 kV mm$^{-1}$. (Where the electrodes move relatively, this is measured at the rest position of the electrodes.)

When an ER fluid is in an electrical field between charged electrodes under conditions of dynamic tension or compression in the device of the present invention, as noted hereinbefore, it may be convenient for the electrodes to form part of the means applying the tension or compression to the fluid.

For example, as also mentioned hereinbefore, the electrodes may respectively form part of a piston face and a chamber end-wall transverse to the direction of motion of the piston.

In such a device, the field gap between the electrodes may vary dynamically between 0.2 and 80 mm (ie between 100 and 0.25% compressive strain or 100 and 40,000% tensile strain), eg between 2 and 8 mm (ie between 100 and 25% compressive strain or 100 and 400% tensile strain).

The rate of strain in the ER fluid may be constant ie independent of the strain itself, or it may vary in a linear or non-linear manner with respect to the strain.

All these parameters depend largely on the application of the device.

Similarly, the rate of strain may vary widely in operational conditions, again depending largely on the application of the device.

Typically it may lie in the range of 0.1 mm/min to 250 mm/sec, eg 1 mm/min to 25 mm/sec.

It is clear that in addition to being subjected to a dynamically varying mechanical stress in the present device, the fluid may also be conventionally subjected to a fixed electrical potential difference between the electrodes, so that it will be electrically stressed by an electrical field varying in phase with the applied mechanical stress.

In such an embodiment, the applied field may in theory vary between the charged electrodes under conditions of dynamic tension or compression from 1 to 8000, eg 2 to 40 kV mm$^{-1}$, and may vary at a rate of 0.1 kV/mm/min to $2 \times 10^6$ kV/mm/sec, eg 2 kV/mm/min to 1000 kV/mm/sec.

In practice, field strengths at the top end of the widest range quoted immediately above, which could arise for large amplitudes of tensile or compressive mutual movement of the electrodes in the present device will greatly exceed the threshhold breakdown field strengths of present-day ER fluids.

In such cases it is preferred to use a bipolar series stack of electrodes to permit greater mutual movement of each pair of electrodes in such devices at moderate field strengths.

The field (as opposed to the potential difference) may however be held constant, or varied in any desired manner.

The optionally varying potential may be applied by any suitable means which is capable of generating the necessary potentials and optional variation therein.

In the case where it is desired to stress the fluid by a constant field, it is of course necessary to increase or decrease the applied voltage in phase with the increasing or decreasing strain; where the rate of strain is constant, this means increasing or decreasing the applied voltage linearly with time.

This may be generally achieved by a conventional electrical and/or electronic servo feedback loop. For example, a linearly variable displacement transducer ('LVDT') may be employed between the piston and the chamber end-wall which serve as insulated carriers of the two electrodes as described above.

The output signal of the LVDT is used remotely to drive the high-voltage supply of the potential applied between the electrodes.

The applied field may be varied in other desired manners by conventional preprogrammed electronic means.

Great potential industrial interest lies in the comparative mechanical behaviour of ER fluids and devices (eg dampers) under different dynamic programs of applied electrical potential and field.

Each electrode in the device of the present invention will typically be of metal.

Suitable metals include iron, cobalt, nickel, titanium and copper and alloys thereof, including stainless steels and low carbon steels.

The present apparatus will generally be used in dynamic (and not static) applications.

In assessing the dynamic response required of the ER fluid in many such applications, the mechanical excitation and stress on the fluid may be formally viewed as varying cyclically.

Typical frequencies for the cyclically variable mechanical stress will depend Greatly on the type of application of the present ER device.

Thus, eg the operation of automotive engine mount dampers may be associated with medium and relatively higher frequencies (described further below).

Relatively lower frequencies will be found in the operation of shock absorbers and like dampers for use in automotive suspension applications.

In General, the operational frequency may be in the range of 0.03 to 350 Hz, for example 0.03 to 200 and 200 to 350 Hz.

Generally applicable frequencies are often in the ranges of 0.03 to 100 and 100 to 350 Hz, eg 0.03 to 60 and 300 to 350 Hz.

However, any operational frequencies and waveforms which it will be necessary to consider in the design of the present apparatus for any specific application will be clear to or readily and routinely ascertainable by the skilled man.

Suitable ER compositions for use in the present apparatus are described in Greater detail hereinafter.

In general any conventional such fluid may be used. However, preferably, any fluid used in the device has a d.c. conductivity at 25° C. below $5 \times 10^{-8}$ ohm$^{-1}$.cm$^{-1}$.

In particular, ER fluids used in the present apparatus preferably have a d.c. conductivity of the order of $5 \times 10^{-9}$ ohm$^{-1}$.cm$^{-1}$ at 25° C.

The electric field applied in use of conventional ER apparatus is typically a d.c. field, and such a field may be applied in the device of the present invention. However, we have found excitation by a cyclically varying field to be advantageous in some applications.

In conventional ER apparatus, which generally operates with the fluid under conventional shear, the apparatus may be used in static or dynamic applications.

The static yield stress of a conventional ER fluid increases with increasing applied electric field intensity, and the apparatus is useful in static applications.

However, in a steady d.c. field, the fluid in such apparatus often has poor dynamic performance. Such apparatus is clearly of limited use in applications such as ER dampers, where Good dynamic performance is required.

Fluids with a Good dynamic response may often also have a high d.c. conductivity.

As noted for conventional fluids in General hereinbefore, there is also a limit to the field potential gradient which can be applied to the fluid. Above a breakdown value for that fluid, that d.c. conductivity increases markedly and there is arcing of electrical current through the fluid.

Fluids with a high d.c. conductivity (and Good dynamic response) may often disadvantageously have a low breakdown potential gradient.

Conventional ER fluids with a high d.c conductivity have a number of further disadvantages also noted hereinbefore which Give rise to problems in their use in ER apparatus, including that of excessive power consumption.

Typically, eg such fluids in a d.c. apparatus exhibit a low so-called doubling temperature. This is the operating temperature increment which causes the conductivity of the fluid to double. It may typically be as low as about 6° C.

Conversely, fluids with a desirably low d.c. conductivity may often also have a poor dynamic response time.

The foregoing disadvantages are avoided by a particular aspect of the apparatus of the present invention which makes use of the cyclically varying applied potential referred to above.

Accordingly, the present invention in a third aspect provides an electrorheological device capable of containing an electrorheological fluid between two electrodes and having means for applying an electrical potential between the electrodes, characterised in that
 i) the device has means for subjecting the fluid to varying compressive or tensile stress, and
 ii) the means for applying an electrical potential is capable of applying a cyclically variable potential.

As noted hereinbefore, preferably, any fluid used in the device has a d.c. conductivity at 25° C. below $5 \times 10^{-8}$ ohm$^{-1}$.cm$^{-1}$. ER fluids used in the present apparatus preferably have a d.c. conductivity of the order of $5 \times 10^{-9}$ ohm$^{-1}$.cm$^{-1}$ at 25° C.

The operational potential and potential gradient applied to the ER fluid in this aspect of invention and their variation are as generally described above.

The applied potential may be varied in any manner which is cyclical. Thus it may be an a.c. potential varying about earth potential in any wave-form, including eg sinusoidal, square or saw-tooth (triangular) waves.

The applied potential may also be a positive or negative similarly varying potential with respect to earth, eg pulsed d.c. at any mean potential with respect to earth.

No difference in the ER behaviour of a given ER fluid is observed whether the applied varying potential is a.c. or pulsed d.c. of the same magnitude and waveform at any mean potential with respect to earth.

As might be expected, the observed ER effect increases not only with the applied field, but also with the power put in at a given maximum input potential.

Thus, for a given maximum applied potential, the observed ER effect increases as the wave form is changed from triangular to sinusoidal to square.

Suitable frequencies for the cyclically variable potential will depend greatly on the type of the present ER device. Thus, eg there are problems associated with at medium and higher frequencies.

These include the skin effect, inductance, pick up and transmission, interference, and the consequent need for rigorous screening of all electrical parts of the apparatus, which are Greatly increased with medium and higher frequencies.

These engineering problems may be acceptable in some specialist dampers. They may not however be acceptable eg in volume automotive applications.

In general, the frequency may suitably be in the range of 1 to 6,000 Hz, for example 1 to 2,000 Hz.

Generally applicable frequencies are therefore often in the range of 1 to 600, eg 1 to 200 Hz.

Such frequencies are favourably 3 to 150, and preferably 5 to 100 Hz.

The varying potential may be applied by any suitable means which is capable of generating the necessary potentials, frequencies and wave-forms.

In general the impedance is relatively high, taking into account the factors mentioned above, so that a large power source is not generally crucial in most practical ER applications which can be envisaged. An industrial high-voltage signal generator will often be suitable.

The apparatus in its basic form with relatively simple opposed electrode surfaces effectively comprises a CR circuit, with a readily determinable resonant frequency which will depend on the dimensions and materials of the apparatus.

For some systems, however, the ER effect also shows a frequency related maximum, which may not be the same as the circuit resonant frequency.

This may well be another factor determining the desired operating frequency of the present apparatus, and indeed may be used in controlling its response.

As described in greater detail hereinafter, at least one of the electrodes may be insulated from the ER fluid.

We have found that the favoured operating frequencies for uninsulated electrodes tend to lie towards the lower end of the abovementioned ranges, and for insulated electrodes towards the higher end.

This aspect of the present apparatus may offer a number of advantages over the present d.c. devices.

Thus, eg the fluid in such apparatus may have good dynamic performance.

Such apparatus would clearly be of potential use in applications such as ER dampers, where good dynamic performance is required.

Also, as noted above, the conductivity of most ER fluids increases with their operating temperature, to the extent that many cannot be put to practical use under every-day working conditions.

In this aspect of the present apparatus, the typical doubling temperature of many fluids may be increased markedly from about 6° C.

This offers the possibility of increasing the practical operating temperature range which is accessible by many conventional fluids.

Fluids whose conductivity at moderately elevated temperatures would normally be too high for practicable use in d.c. ER apparatus, but which may have other desirable characteristics such as a fast response time, may be used, without excessive power consumption.

Further, as noted above, the frequency-related maximum of the ER effect of some systems may be used in controlling and tuning the desired apparatus response.

The present apparatus appears to offer a number of further advantages over the d.c. apparatus of the present invention:

The breakdown potential gradient of many conventional ER fluids tends to lower in the long term.

This is probably due to the longer term electrochemical degradation of the fluid under repeated application of d.c. potentials and with the transmission of d.c. currents. In this aspect of the present apparatus the net current transmitted will often be substantially lower, so that this effect will be lowered.

Where the potential applied in the present apparatus is an a.c. potential, there will be no net d.c. current transfer through the fluid, so that any electrochemical effects will be minimised.

In a particular embodiment of the third aspect of the present invention, at least one electrode comprises an electrically insulating surface coating.

By 'insulating surface coating' herein is meant any coating on such an electrode which gives an apparent d.c. conductivity of an ER fluid in the apparatus of less than $5 \times 10^{-10}$ ohm$^{-1}$.cm$^{-1}$ at 25° C.

If this embodiment of the third aspect of the present invention is used with a steady applied (d.c.) potential (and thus steady field) between the electrodes, no ER effect is observed.

When such a steady d.c. potential is applied, the resistance of the insulating layer on at least one electrode is the current-limiting factor, and the negligible conduction through the fluid is insufficient to produce the ER effect.

Without prejudice to the generality of the third aspect of the present invention, it appears surprising that, when a cyclically varying potential is applied between the mutually insulated electrodes, the current induced in the ER fluid is sufficient to give rise to an ER effect.

It is all the more surprising that such an effect occurs notwithstanding the high limiting series resistance of the electrode coating.

At the practical field frequencies used (discussed above) the ER effect is comparable to that achieved with the same d.c. potential under the same conditions.

This embodiment of the third aspect of the present invention offers a number of advantages over the d.c. apparatus of the present invention. Thus, although an apparent current flows through the fluid in use, its magnitude is limited by the impedance of the apparatus rather than by the fluid d.c. resistance.

Power consumption for an equivalent tensile or compressive stress will therefore generally tend to be reduced.

Such fluids may also be driven to higher stress values by applying higher potential gradients, without the risk of such potential gradients causing fluid breakdown.

The insulation on the electrode(s), by reducing the risk of fluid breakdown, will render the apparatus safer in practical use.

Conventional ER apparatus entails the application of a high potential across an ER fluid usually contained in a metal housing.

For safety, such a housing must be earthed and insulated. Where both of the present electrodes are insulated, this is unnecessary and the apparatus is considerably safer than the conventional apparatus.

Where both electrodes are insulated in this embodiment of the third aspect of the present invention the range of fluid and electrode materials which may be used is conveniently extended.

Thus, convenient and cheap liquid vehicles for ER fluids such as organohalogens, eg chlorinated aliphatics may be more readily used.

In conventional ER apparatus, where such a fluid is in contact with the (generally metal) electrodes, there may be a risk of longer term corrosion of the electrode.

This will be the case unless it is made of a (generally more expensive) corrosion resistant metal, such as a stainless steel.

There is thus also a risk of consequent contamination by metal ions and/or particles and degradation of the fluid.

The above extension of the range of suitable electrode and fluid materials is brought about because most of the insulator coatings in this embodiment of the third aspect of the present invention (described further below) which sheath the electrodes tend to be chemically inert to such fluids.

Turning to the features of this embodiment of the third aspect of the present invention, it will be appreciated that the coated electrode may be a single coated electrode in the third aspect of the present invention.

It may also be one of a plurality of coated electrodes in a multielectrode apparatus.

Any coated electrode will typically be of metal, such as described hereinbefore.

The present insulating coating may be any that fulfils the criteria given hereinbefore.

Such materials will generally be present as a coating on a metal electrode, for example to a thickness in the range of 1 to 5000 micron, such as 50 to 4000 micron.

The thickness will however depend greatly on the resistivity, dielectric constant and other physical properties of the insulator material.

The insulator will often have a resistivity in the range of $10^{10}$ to $10^{15}$, eg $10^{10}$ to $10^{13}$ohm m$^{-1}$, and a dielectric constant in the range of 2 to 8.

Within these ranges, it is often favoured that the relevant constant be as high as possible.

The insulator may for example comprise an organic plastics polymer or an inorganic material such as ceramic, a glass or a Glass-ceramic.

Preferably, the insulator will have a softening or decomposition temperature at least 50° C., preferably at least 100° C., above its operational temperature.

However, this may vary considerably with its specific application.

When a polymer, the insulator may be any type of homo- or co-polymer on polycondensate, including random, block and graft co-polymers.

The polymers may be cross-linked or not. The polymer will seldom be a pure compound, but will often consist of a molecular weight cut of a mixture of congeners.

The polymer may suitably be a polyester, such as poly(ethylene terephthalate); or a polyolefin, such as polyethylene or polypropylene.

The polymer may also suitably be a polyfluoroolefin, such as polytetrafluoroethylene; a polyvinylic, such as polyvinyl-chloride; or polyacetal.

The polymer may further suitably be a copolymer of any of the foregoing, such as a cross-linked ethylene—vinyl acetate (EVA) or ethylene—propylene—diene monomer (EPDM) rubber.

Preferably, the polymer will have a softening or decomposition temperature at least 50° C., more preferably at least 100° C., above the operational temperature of the present apparatus, although this may vary considerably with the specific application.

One suitable class of polymers which fulfils the above criterion for preferred polymers includes homo- and co-polymers of dienes, optionally with acrylics.

Such materials include polymers of butadiene, isoprene, 1,5-cyclooctadiene, optionally with acrylonitrile.

A particularly suitable class of diene copolymers are those with styrene, such as the Cariflex series (Shell).

Other suitable classes of polymers are believed to include polyaromatics such as polyphenylene, polyamides and polyimides.

Especially suitable polymers are believed to be those polyaromatics with a high aromatic content, and other high-temperature polymers, such as PES, PEK and PEEK from ICI.

A yet further suitable class is believed to include resins, such as thermosetting epoxy resins (eg the reaction product of epichlorhydrin and bisphenol A, together with curing agents) and acrylics resins.

The insulator may be a ceramic, Glass or Glass-ceramic.

Preferably, such an insulator will have a softening temperature at least 50° C., more preferably at least 100° C., above the working temperature of the present apparatus, although this may vary considerably with the specific application.

Where the insulator coating is a ceramic it is preferably one selected from the Group consisting of beryllia, aluminia, titania, zirconia, and silica.

It may also preferably be one selected from the Group consisting of aluminium nitride, silicon carbide and silicon nitride.

It may also preferably be one selected from the Group consisting of strontium nitride, barium titanate and barium zircotitanate.

Suitable Glasses for the insulator coating include respectively medium and high-softening or melting barium and lead borosilicate and aluminosilicate and other barium Glasses.

Suitable Glasses for the insulator coating also include respectively medium and high-softening or melting Glass containing dissolved metal oxides.

The foregoing glasses may eg be glasses melting or softening in the range of 500° to 900° C.). The insulator may also be a low softening or melting glass, such as a soda glass.

Suitable glass-ceramics include medium-softening or melting lead borosilicate and aluminosilicate silicate glasses containing dispersed particulate ceramics.

Suitable such ceramics include metal oxides, such as beryllia, alumina and zirconia.

Suitable such ceramics also include silica, aluminium nitride, silicon carbide and silicon nitride.

Suitable such ceramics also include strontium nitride, barium titanate and barium zircotitanate.

Mixtures of all the foregoing materials may be used.

For ease of application (see below) glass or glass ceramic insulators derived from devitrifying glasses and glass ceramics respectively may be favoured.

In all cases, the insulator will often also be chosen for its ability (together with any vehicle) to be formulated in a routine manner into a precursor composition for application to the electrode. Such a precursor composition will generally comprise the insulator as appropriate as a melt, or a solution or particulate dispersion in a fluid vehicle.

For example, a polymer precursor composition may be a typical polymer paint, comprising the polymer in solution, gel and/or dispersion in an organic vehicle.

A glass or glass ceramic precursor composition may be a commercially available firable dielectric composition.

The composition may be applied to the relevant electrode surfaces as appropriate, eg by dipping, painting, curtain or roller application, printing, or by masking and spraying.

The precursor may then be converted into the insulator, also in a manner known to the skilled man, eg by allowing an applied melt to solidfy.

In the case of a polymer, the applied fluid precursor (which may contain curing agents) may be dried off and cured.

In the case of a glass or glass-ceramic, the coated electrode may be fired to produce the fused coating on the electrode.

Suitable process parameters, including temperatures and heating profiles in such cases, will be apparent to the skilled man.

For example, for a dielectric composition, the firing is preferably carried out at a temperature towards 900° C., optionally first applying a dwell time at about 500° C.

In all cases the coating and conversion steps may be repeated as often as is desired.

The ex situ formation of a solid insulator coating and its application to the electrode, eg with a suitable adhesive, is not excluded.

This may be the only convenient or practicable means of applying a cohesive insulator coating eg where it is a cross-linked polymer sheet or a layer of a refractory ceramic.

It is of course preferred and advantageous that the coating is cohesive and non-porous, and has no pinprick defects, which could lead to electrical breakdown of the coating.

Preferred coating materials will be those which also have better abrasion resistance and other relevant strength properties than other equivalent insulators. (For these reasons, preferred insulator polymers tend to be crosslinked).

The best materials and the best method of application for any given insulator material to ensure this will be known to the skilled man, or may readily and routinely determined by him without undue experimentation.

Suitable ER fluid compositions for the present devices will now be described:

Such compositions may be any conventional ER fluids, eg they include any of the following particulate solids suspended in an inert electrically highly resistive fluid vehicle (as described more fully hereinafter) eg a silicone oil (such as a 50 cSt polydimethylsiloxane or C111/50; ICI): an organic ion-exchange resin, a particulate semiconductor material, eg a poly(acene-quinone) radical or a polyaniline, or an aliphatic starch.

However, preferred fluids are any which fulfil the conductivity criteria given hereinbefore.

Preferred fluids include those comprising a dispersion of a high alumina exchanger aluminosilicate optionally comprising water in a similar vehicle.

The term 'exchanger aluminosilicate' herein means any inorganic material comprising
a) a moiety of empirical formula $$(Al_2O_3)_b (SiO_2)_c$$

where b and c are any numerical values provided that the ratio of b/c never exceeds 1, and
b) mono- or divalent main group metal cations, hydrogen ions or optionally substituted ammonium ions.

In some of these materials the ions are exchangeable.

The term embraces crystalline inorganic materials for example zeolites, micas and vermiculites.

These materials may be natural or synthetic and commercially available, or derivable from such materials e.g. by ion exchange.

The term extends to materials in which the cations are an infinitely variable mixture of two or more such species.

'High alumina' herein means any exchanger aluminosilicate in which the ratio of b:c lies in the range of 1:1 to 1:9.

Crystalline materials are preferred.

Examples of high alumina exchanger aluminosilicates are given hereinafter.

The particulate disperse phase, or the exchanger aluminosilicate comprised therein, which is used within the ER fluids of the present invention, forms an aspect of the invention.

Zeolites within the scope of the aluminosilicates within the ER fluids suitable for use in the devices of the present invention include crystalline inorganic materials of which the empirical formula is $$M_aO(Al_2O_3)_{b'} (SiO_2)_{c'} (H_2O)_d \qquad (I)$$

where
M is a mono or divalent main group metal cation or hydrogen or ammonium ion,
a is 1 where M is divalent and 2 where M is monovalent, and
b',c',d are any numerical values, save that the ratio of b'/c' can never exceed 1:1 and c' is never less than 1, and thus include natural and commercially available zeolites, and materials derivable therefrom.

Materials may be derived from commercially available materials by ion exchange of $M_a$ or by removal of water. (Zeolites are known ion exchange and hygroscopic minerals).

The definition extends to materials in which $M_aO$ is an infinitely variable mixture of two or more species falling within the definition of $M_aO$.

ER fluids comprising the above materials in the disperse phase tend to have good ER properties, including eg a good stress to applied voltage ratio.

Preferred materials (described further hereinafter) tend to confer a low d.c. conductivity on the relevant fluid.

Suitable high alumina exchanger aluminosilicates in the present fluids include those wherein a cationic species is ammonium or a Group IA or IIA metal.

Suitable high alumina exchanger aluminosilicate in the present fluids include in particular those wherein the or one cationic species is for example lithium, sodium, potassium, magnesium or calcium, and mixtures thereof, preferably potassium or lithium.

In the materials of the present invention the cations generally form 1 to 50% w/w of the disperse phase.

In one group of exchanger aluminosilicates of interest the ratio of b:c lies in the range of 1:1 to 1:5, in particular 1:1 to 1:3.

Typically any optional water content is pure, but it may also be an aqueous solution of a polar solid, such as an inorganic salt.

Examples of such salts include salts of any of the cations listed above with sulphuric, hydrochloric or organic carboxylic or sulphonic acids.

The water is adsorbed, coordinated and/or adsorbed into the aluminosilicate structure.

The precise physical state of this 'water' is not always clear. However, the term 'water' herein extends to all physical states of the water in the present aluminosilicates, as is conventional e.g. for zeolites with a water content.

Any water comprised in the aluminosilicate will generally be 0.05 to 10% w/w of the disperse phase, although it may vary widely up to larger values, e.g. up to 30% w/w.

Even above a certain water content—about 10% w/w—(all other parameters being fixed), good values of stress to applied voltage ratio tend to be retained for corresponding ER fluids.

However, we have found the conductivity of such fluids, and hence the power consumption tend to increase disadvantageously, eg by more than 50%.

There will also typically be an increased tendency to electrical breakdown at lower applied voltages.

It is therefore preferred that the total water content of the disperse phase exchanger aluminosilicate is less than 10% w/w, more preferably less than 5% w/w. In the case of preferred lithium-based materials, it is preferably less than 1% w/w, eg less than 5% w/w.

It will be appreciated that the last named materials are essentially anhydrous.

However, a suitable or the optimum water content may vary widely with the particular adsorbate and the specific ER fluid vehicle but may be determined routinely.

Higher water contents may be permissible where the water content and/or each relevant disperse phase particle is encapsulated from the-rest of the ER fluid.

The particle may be encapsulated e.g. by a hydrophobic fluid, gel or wax which is insoluble in the vehicle of the corresponding ER fluid of the present invention.

The water content is often exchangeable, and may be adjusted by equilibration of a water-free material with water or with air at a desired non-aqueous water partial vapour pressure or equilibration as the disperse phase or a component thereof of an ER fluid.

In such a method the vehicle of the fluid has a controlled water content in mutual admixture with the rest of the vehicle.

Generally however, the water content is adjusted by controlled (at least partial) desiccation under heat and/or reduced pressure, optionally in the presence of a desiccant such as $P_2O_5$.

Particles of 0.1 to 20 micron mean cross-dimension (corresponding to particular particles of the present invention) are preferred for their relatively shorter desiccation equilibration times.

Particular high alumina exchanger aluminosilicates thus include zeolites such as materials for the fluids of the present invention derivable from Zeolites A and X (Union Carbide) and Y (Strem).

Such zeolites may be derived for example by
a) controlled reduction of water content, and
b) optionally conventional ion exchange of $M_a$.

If necessary the starting auminosilicate may be prepared from a commercially available ion-exchange aluminosilicate by conventional ion exchange followed by washing.

Thus for example in derivatives of the A series $M_a$ may be inter alia potassium, $K_2$ (from Zeolite 3A), sodium, $Na_2$ (from Zeolite 4A), or, calcium, Ca (from Zeolite 5A).

Similarly, the $Na_2$ in Zeolite X derivatives may be optionally exchanged with the same cations. $M_a$ may of course be exchanged with two or more ions to give a 'mixed' zeolite within the scope of present invention. These zeolites have cubic particle morphology.

Favoured exchanger aluminosilicate disperse phases or exchanger aluminosilicate components for the disperse phase which impart ER properties to the fluid include those with a low d.c. conductivity.

Such materials tend to confer reproducible and controllable operational parameters, and Good stress to applied voltage ratio with low power consumption and a high breakdown voltage on the corresponding ER fluids.

Such materials include:
a) those with a low water content generally (which is similar to that recommended hereinbefore) and
b) in particular, those zeolites of formula (I) wherein $M_aO$ is CaO, $(NH_4)_2O$, MgO or $K_2O$, especially Zeolites 5A (calcium) derivatives.

Another group of favoured exchanger aluminosilicates disperse phases or exchanger aluminosilicate components of disperse phases include those with a good stress to applied voltage ratio at elevated temperatures.

Examples of such temperatures include those over 40° C., such as 50° to 100° C. or 50° to 150° C.

(As noted hereinbefore, some typical working environments and/or the fluid itself (owing to heat generated in the fluid in use, eg as a clutch fluid) may often have such elevated temperatures).

Such present materials include those zeolites of formula (I) wherein $M_aO$ is $K_2O$, or $Li_2O$ especially Zeolite 3A (potassium) derivatives, having a low to negligible water content similar to that indicated hereinbefore as desirable.

As noted hereinbefore, the conductivity of ER fluid disperse phases tends to increase with temperature, leading to higher power consumption and a lower breakdown voltage.

A preferred group of the present materials thus includes those with a good stress to applied voltage ratio and a low conductivity at elevated temperatures.

Such materials again include those of the present invention wherein $M_aO$ is $K_2O$, especially Zeolite 3A derivatives.

Another group of favoured exchanger aluminosilicates disperse phases or zeolite components of disperse phases include those with a good stress to applied voltage ratio over a wide temperature range, for example 0° to 100° C. or 0° to 150° C., for use in a wide variety of working environments.

Such materials include:
a) those single zeolite materials of formula (I) wherein $M_aO$ is a mixture of two or more species falling within the definition of $M_aO$, and b) mixtures of two or more single such materials in each of which $M_aO$ is a single species.

In either type of mixture, two species of $M_aO$ will often be used.

These species will often be chosen such that one has a good performance towards the lower end of the desired temperature range and the other towards the upper end.

The choice is also dependent at the upper end of the range, however, on the thermal stability of both materials.

Such materials will be determined by the particular application profile required but include single species and two species in which $M_aO$ is CaO and $K_2O$.

An example of this latter is a Zeolite A derivative containing both CaO and $K_2O$.

Another example is a mixture of derivatives of Zeolites 5A and 3A.

In the specific case of such materials containing two $M_aO$ species, the two may each be present as 1 to 99% and 99 to 1% w/w respectively of the total $M_aO$ content, depending on the exact performance against temperature profile desired and the specific ions or materials used.

The different $M_aO$ species may be present in different zeolite exchanger aluminosilicates in the present ER fluid disperse phases.

In such case, they may each be present in each particle of the ER fluid disperse phase, either a) in mutual admixture and/or as a coating of at least one on at least one other, or b) the disperse phase may consist of a mixture of sets of particles, the particles in each set being essentially homogenous and of one zeolite exchanger aluminosilicate species.

In all such species, the total water content of the disperse phase is desirably similar to those values indicated as favoured or preferred hereinbefore.

It will be appreciated that although the concept of mixed ER active species within an ER fluid disperse phase, and a rationale for and ways of effecting such a mixture has been described above in terms of aluminosilicate disperse phase (components), the concept, rationale and ways extend to all other ER particles and disperse phase materials which may be used in the present devices.

Thus, eg any of the foregoing particles or disperse phases may advantageously consist of at least two ER active materials, one of which is an exchanger aluminosilicate.

Again, any such ER active materials may be mixed in similar manner with any material which is not ER active. That is, the particles of the disperse phase may consist of a mixture of any of the foregoing materials or the disperse phase may consist of a mixture of ER active particles with other particles.

This is however provided that the other material and the way in which it is mixed with the ER active material is compatible with the ER active material (eg the exchanger aluminosilicate).

This is also provided that the other material and is such that the resultant disperse phase is compatible with the properties of the vehicle and desired properties (including ER properties) of the corresponding ER fluid.

For this reason, the other materials or particles are preferably also capable of imparting ER properties to the fluid.

Among suitable other materials in the disperse phase particles of ER fluids which may be used in the devices of the present invention, however, are conventional inert coating and core materials such as cellulose derivatives, alumina and silica.

Among suitable other materials are also conductors e.g. carbon (such as from superficial coking).

Such materials are however much less preferred as they tend to make the corresponding ER fluid more conducting to a disadvantageous extent.

Where an exchanger aluminosilicate is a component in mutual admixture with, or present as a coating on or core for, another material in the disperse phase or particles, the exchanger aluminosilicate content will generally greatly predominate; eg it may be present as 90 to 100% w/w of the disperse phase.

Often the exchanger aluminosilicate(s) will be present as 100% of the disperse phase and particles.

However, the optimum aluminosilicate (e.g. zeolite) proportion may vary widely from this figure with the specific ER fluid and the specific desired ER effect, but this optimum may be readily ascertained by routine trial.

Such other material species may of course also comprise water or a different polar adsorbate any such adsorbate is preferably water.

In this regard, where the ER active material is an aluminosilicate as hereinbefore described, it may often be desirable that the alumina content and any water content of the total disperse phase are similar to those indicated hereinbefore as suitable, for the exchanger aluminosilicate itself.

Where all the particles of a disperse phase comprise a labile water content, it is desirable that the water content of the disperse phase is essentially homogeneous for operational stability of the corresponding ER fluid.

The proportion of disperse phase in the ER composition is determined by the particular application of the composition, and the vehicle used, since these will determine the desired or acceptable viscosity.

The desired proportion of disperse phase may thus be determined by routine optimisation.

In general depending on the vehicle, 25 to 60% by weight fraction of the total composition will be pumpable in use.

15 to 65% by weight will be suitable for most applications.

For some applications higher or lower viscosities and hence higher or lower fractions respectively may be tolerable or necessary.

Higher fractions may be used if the disperse phase is surface treated, if the vehicle has a fairly low viscosity, or if high temperature operation is envisaged. Higher fractions may, however, only be used provided that the (solids content-related) no-field viscosity of the fluid is not thereby increased to a disadvantageous or impractical extent.

High stresses at relatively low voltage gradients and/or current densities can be achieved (as shown in the Example hereinafter) with average fluids.

With the preferred fluids described hereinbefore, even higher stresses at relatively low voltage gradients and/or current densities can be achieved.

It may then be possible or even advantageous to use a lower solids content, eg a weight fraction of 15 to 25% may be suitable.

The disperse phase particles of the composition of the present invention may suitably have a mean cross-dimension of 0.1 to 50, eg 0.1 to 20 microns.

This is dependent at the upper end of the size range, however, on the minimum field gap in which the composition is to be used, which should be at least 10 times the largest particle cross-dimension.

Particle cross-dimensions below 0.1 micron are best avoided, both because of the effect on the physical properties of the corresponding ER fluids and because of the generally higher potential toxicity of the dry disperse phase compared with that of larger particles.

For reproducible and controllable operational parameters of the corresponding ER fluids of the present invention, a narrow size distribution is advantageous.

Preferred materials as ER fluid vehicles or vehicle components include silicones, especially polydialkylsiloxanes and polydiaralkylsiloxanes.

Such materias also include substituted aromatic silicones such as bis(chlorinated phenyl) silicones.

Favoured vehicles or components therefor include halogenated higher aliphatics such as chlorinated $C_{10-30}$ paraffins.

These typically will be hydrocarbon cuts such as $C_{10-13}$, $C_{14-17}$, $C_{18-23}$ and $C_{24-30}$. Typically these will have a chlorine content of 25 to 60% w/w, for example 29 to 33% and 49 to 53%.

Examples include the Cereclor series (registered trade mark, ICI).

Other suitable vehicles or components therefor are much less preferred, as they are more conducting than the foregoing, favoured components.

Such less favoured materials include halogenated vinylic polymers, eg poly(trifluorovinylchloride) Fluorolube FS-5; Hooker) and perfluoro polyethers such as Fomblin (Montedison).

Lower aliphatic derivatives such as cyclohexane, carbon tetrachloride and chloroform are also suitable but less favoured as vehicle components.

Other vehicles or components therefor include unsubstituted aromatic hydrocarbons, such as toluene and xylene, and substituted aromatic hydrocarbons, such as nitro-benzene, chlorobenzene, bromobenzene, and p-chloro-toluene, o-dichlorobenzene and polychlorinated biphenyl fractions such as Aroclor 1242 (registered trade mark, Monsanto).

It will be appreciated that the first-named halogenated higher aliphatics and the silicones are also favoured because of their Generally lower toxicity than that of other vehicles/components named. They may be used alone or in mutual admixture.

It is desirable to optimise the ER fluid dispersion, and to ensure that the vehicle viscosity does not unduly increase the ER fluid rest viscosity.

It is advantageous to ensure this by ensuring that the vehicle does not differ in density too Greatly from the disperse phase, and they are preferably density matched.

To achieve density matching, the vehicle may be a mixture of at least two components, one denser, and the other less dense, than the disperse phase. Since densities and viscosities vary widely with temperature, any match should be at the fluid operating temperature.

The preferred zeolite materials for use in the device of the present invention have relative densities in the range of 1.5 to 2.2, and the preferred vehicles relative densities in the range of 0.8 to 1.3.

The dispersion may also be optimised by using a surface-treated e.g. surfactant-treated disperse phase, and including a gellant in the vehicle, such that the ER fluid composition a) has a rest viscosity which works against settling out of the disperse phase, yet b) has a sufficiently low dynamic viscosity for an ER fluid.

The composition may also comprise a fluidiser such as sorbitan mono- or sesqui-oleate, although it is preferred to adjust the ER fluid viscosity as hereinbefore described.

The preparation of such ER fluids is conventional.

EXAMPLES

The performance and mechanical strengths of ER fluids in an ER device of the present invention were tested under conditions of dynamic compression and tension, in Example 1 at relatively low stress frequencies, and in Example 2 at relatively high stress frequencies.

EXAMPLE 1

The apparatus is described Generally in relation to FIG. 1.

In FIG. 1 the device 1 according to the present invention is in the form of an assembly 2 comprising a radially extending piston 3.

The piston 3 is slidably housed in a shallow circular well ('chamber' 4), capable of containing an electrorheological fluid 5 between two electrodes 6 and 7.

The device 1 has means 8 (here an industrial high voltage d.c. or a.c. supply) for applying an electrical potential between the electrodes 6 and 7.

The assembly 2 is mounted in a conventional compressive and tensile testing machine 9.

In the machine 9, the chamber 4 is fixed stationary, and the piston 3 mounted on an upper arm 10 movable relative to the chamber 4, which thus provides means for subjecting the fluid to varying compressive or tensile stress.

In operation of the machine 9, the fluid 5 may be squeezed out of and escape from or be admitted to the swept or dead volume within the chamber 4, with some braking effect, past the piston.

Alternatively, a conduit in the walls of the chamber 4 may serve the same function.

In further detail, a stationary circular plate 11 of an insulative material with a shallow circular well 4, 5000 $mm^2$ in area and some 13 mm deep, is fixed to a lower arm 12 of a tensile and compressive testing machine 9 having a working range of 0.05 to 20 kN. The floor of the well 4 is covered by a sheet copper electrode 7, from which a copper wire 13 passes through the plate 11 to a first terminal 14 of a high-tension voltage generator 8.

A piston 3 in the form of a disc 70 mm thick is mounted on the movable upper arm 10 of the machine 9, and bears a sheet copper electrode 6 on its lower face, from which a copper wire 15 passes a second terminal 16 of the high-tension voltage generator 8.

The piston 3 is slidably housed within the well 4, and is of such overall diameter that the radial gap between the piston 3 and the circumferential wall of the well 4 is 23 mm.

The piston electrode 6 may in turn optionally be covered with an insulating coating 17 (not shown) of self-adhesive PVC 0.1 mm thick when the device 1 is used with cyclically varying potentials, as mentioned hereinbefore.

The assembly 2 is mounted in the machine 9 such that the rest position separation between the axial faces and of the electrodes and is 3 mm for tensile testing and 8 mm for compressive testing, regardless of the optional insulation on the electrode 6 on the piston 3.

The upper arm 10 may be moved towards and away from the fixed electrode 7 at a preset rate or with a preset rate program by a variable speed motor.

The speed of the upper arm 10 and hence the rate of strain in the fluid is closely controlled by a feedback control through a transducer in a load cell 18. In the present case, the fluid was tested at a constant strain rate (in this case 2.2 mm/min).

The potential applied by the generator 8 across the electrodes 6 and 7 was applied by a Brandenberg Alpha Series II d.c. generator, when d.c., and by a conventional 50 Hz mains transformer as an a.c. generator, when a.c.

The potential was monitored by an elecrostatic voltmeter 19 across the terminals 14 and 16.

In one test embodiment, a constant d.c. field was applied to the fluid 5 (that is, the potential was changed linearly with time in an appropriate sense with a linear applied strain rate.

In such case, the applied potential was regulated employing a Schaevitz LVDT 20 between the piston 3 and plate 4, the amplified output signal of the LVDT 20 being used to drive the high voltage supply 8.

The stress on the fluid 5 was electrically sensed and transduced and the resultant output signal fed to a pen recorder 20.

The ER fluid between the two electrodes was a suspension of an aliphatic starch in a 50 cSt polydimethylsiloxane) of mean particle size c. 30 $\mu$, and forming 50% w/w of the fluid.

Figure 2:
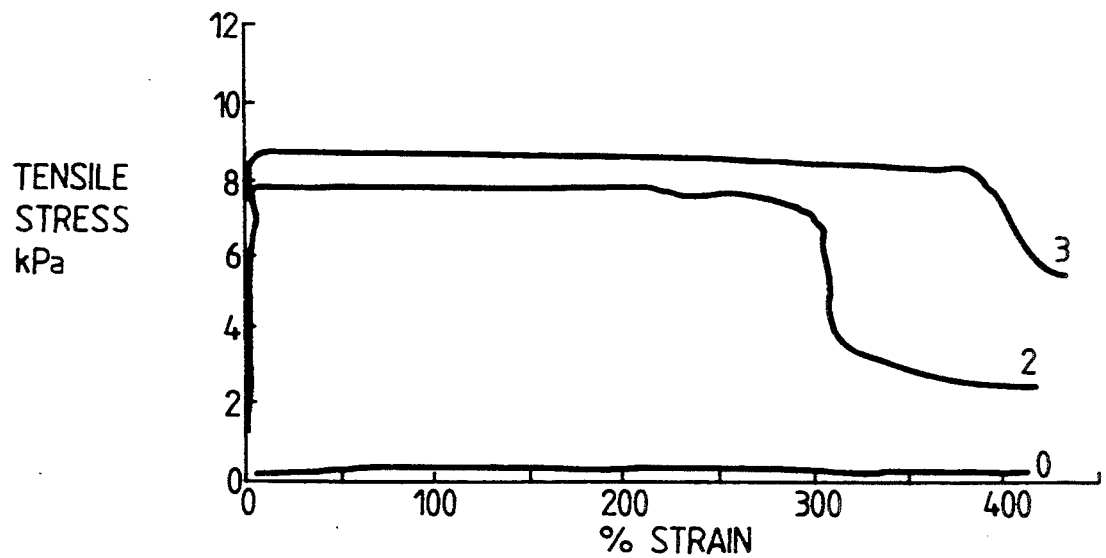
FIG. 2 is a graphical representation showing the tensile stress of the fluid at constant values between 0 and 3 kV of a constant d.c. potential applied across the electrodes.

The test results which were obtained are shown graphically in FIGS. 2 to 7, in which FIG. 2 shows the tensile stress of the fluid at constant values between 0 and 3 kV of a constant d.c. potential applied across the electrodes.

Figure 3:
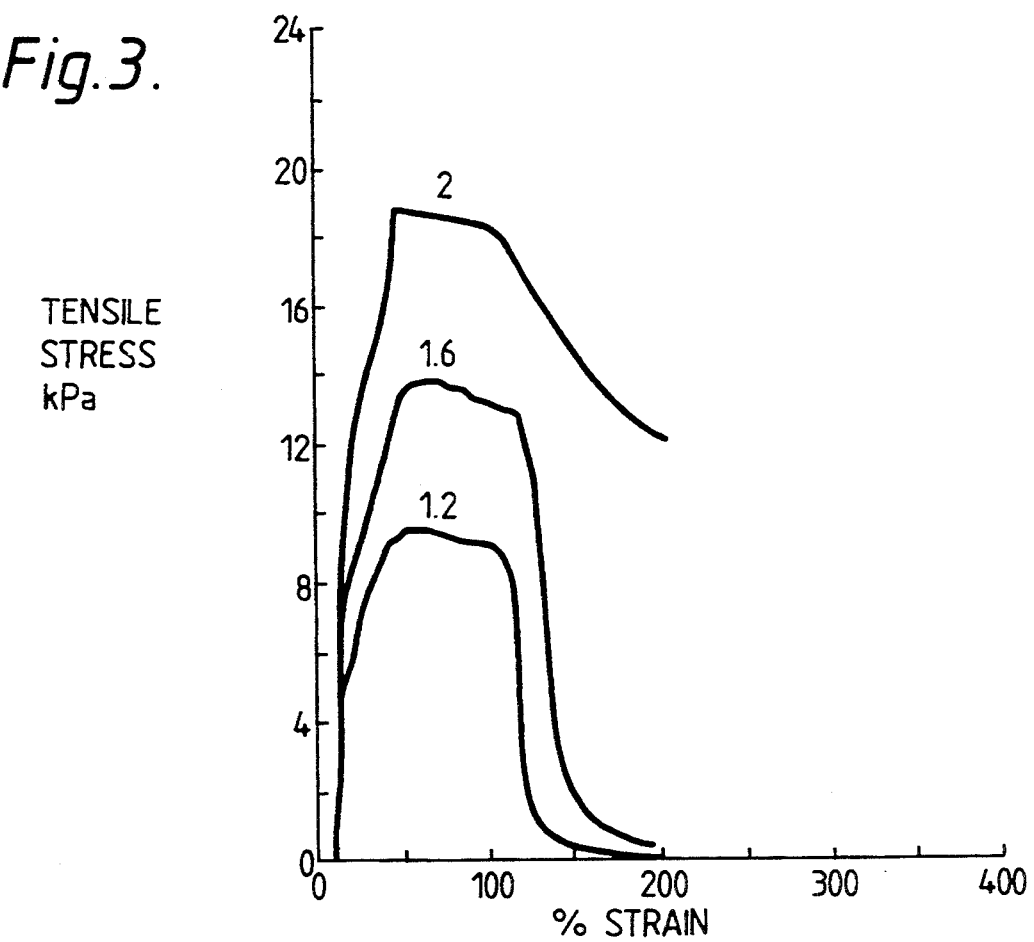
FIG. 3 is a graphical representation showing a tensile stress of the fluid at constant values between 1 and 2 kV/mm of a d.c. potential between the electrodes.

FIG. 3 shows the tensile stress of the fluid at constant values between 1 and 2 kV/mm of a d.c. potential between the electrodes.

Figure 4:
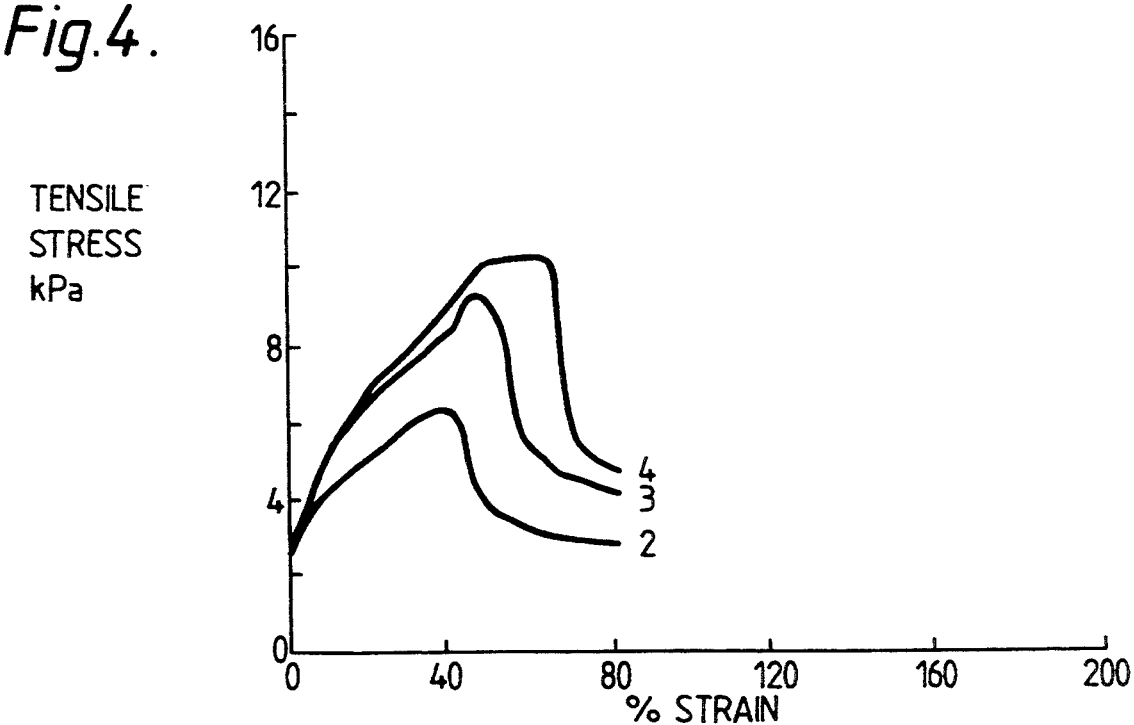
FIG. 4 is a graphical representation showing the tensile stress of the fluid constant values between 1 and 4 kV r.m.s. of an a.c. potential at 50 Hz sinusoidal frequency applied across the electrodes.

FIG. 4 shows the tensile stress of the fluid at constant values between 1 and 4 kV r.m.s. of an a.c. potential at 50 Hz sinusoidal frequency applied across the electrodes.

Figure 5:
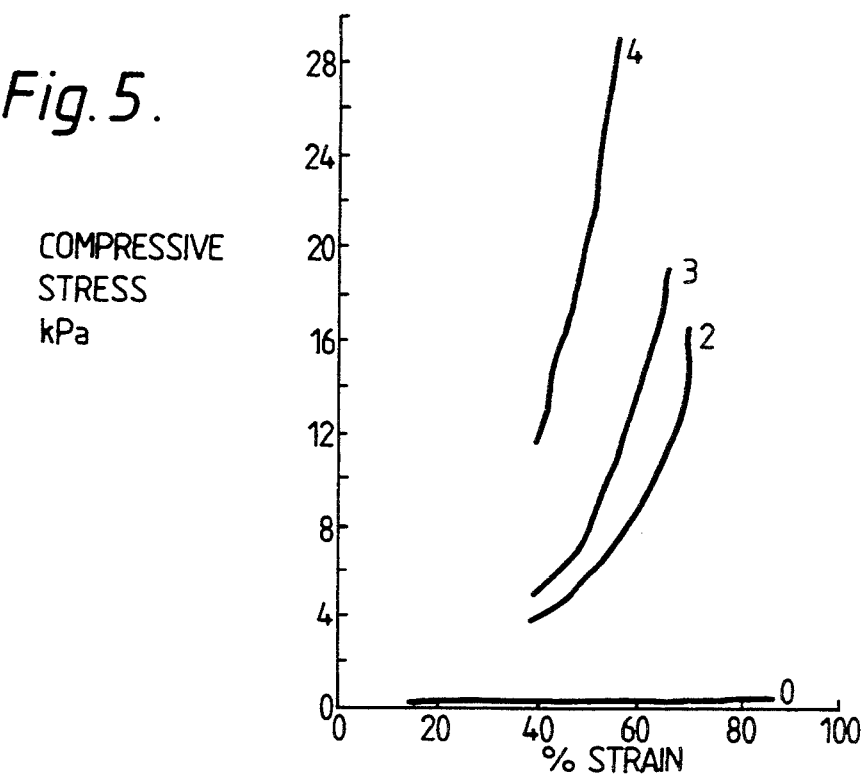

FIG. 5 shows the compressive stress of the fluid at constant values between 1 and 2 kV of a d.c. potential applied across the electrodes.

Figure 6:
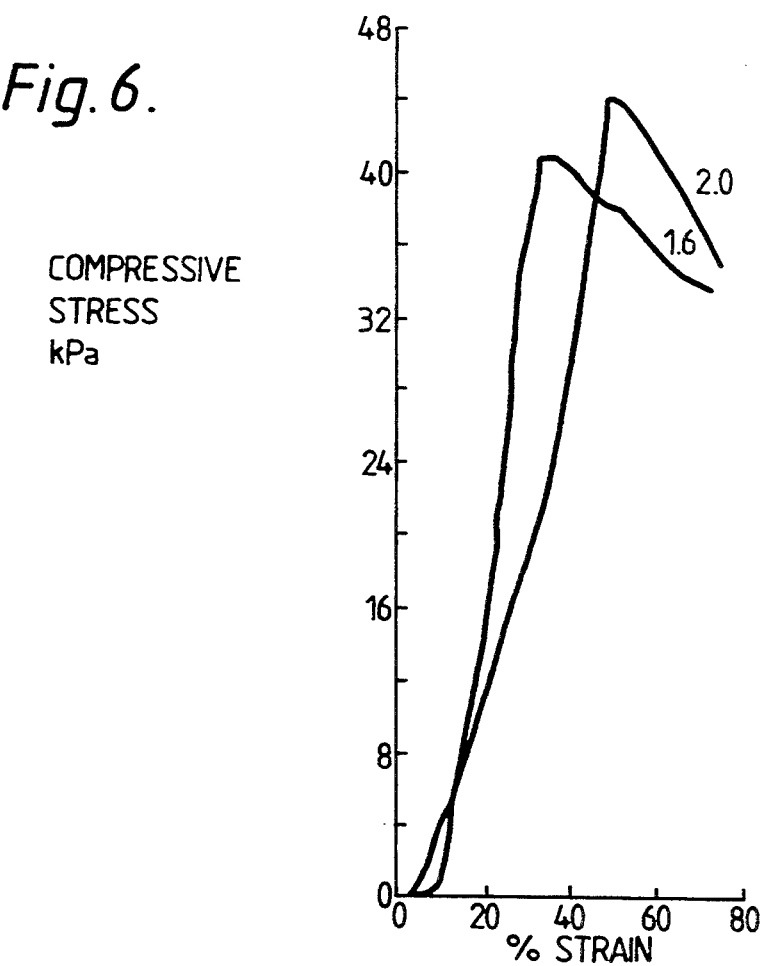
FIG. 6 is a graphical representation showing the compressive stress of fluid constant values between 1 and 2 kV of a d.c. potential applied across the electrodes.

FIG. 6 shows the compressive stress of the fluid at constant values between 1 and 2 kV/mm of a d.c. potential between the electrodes.

Figure 7:
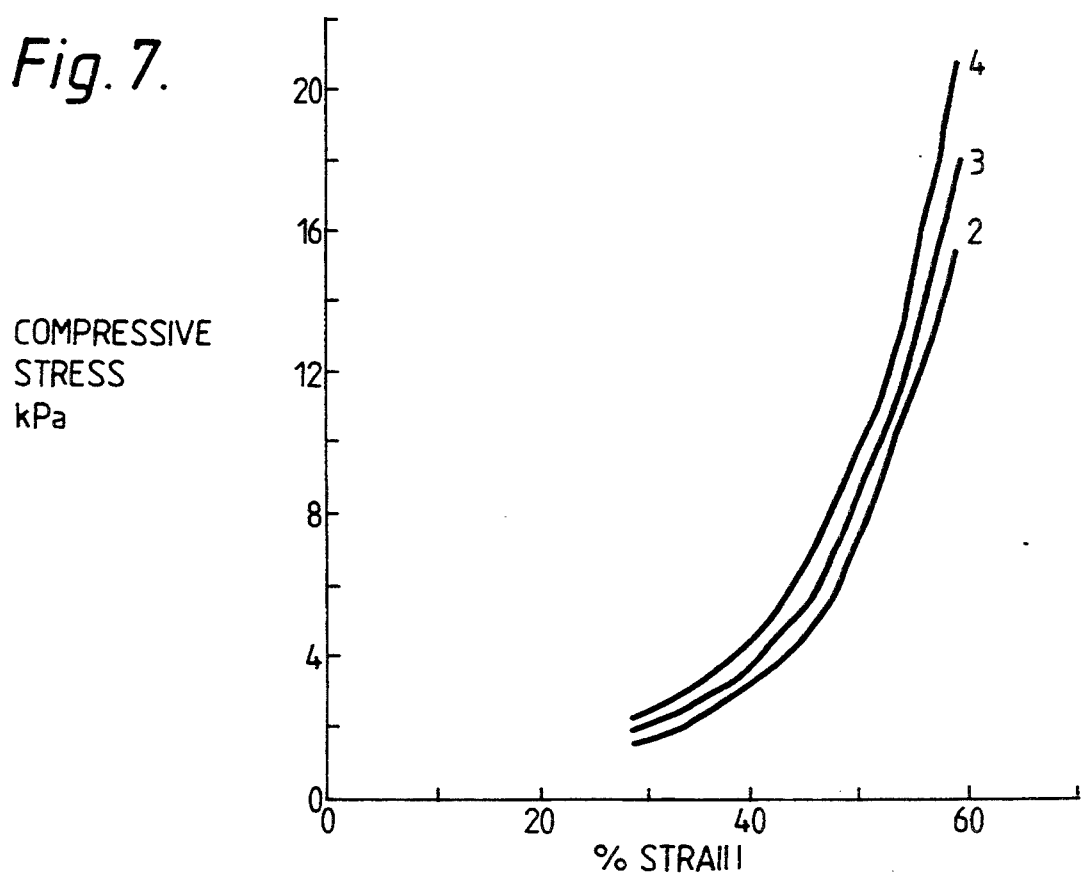
FIG. 7 is a graphical representation showing the compressive stress of the fluid at constant values between 1 and 4 kV r.m.s. of an a.c. potential at 50 Hz sinusoidal frequency applied across the electrodes.

FIG. 7 shows the compressive stress of the fluid at constant values between 1 and 4 kV r.m.s. of an a.c. potential at 50 Hz sinusoidal frequency applied across the electrodes.

(The relevant potential in kV or potential in kV/mm is indicated by the respective graph lines in each case.)

All results were obtained at a constant run temperature of 30° C. and at a constant applied tensile or compressive strain rate of 2.2 m/min.

The type of fluid used is only capable of sustaining a conventional shear stress of 1 kPa when stressed electrically by a field of 2 kV/mm.

From FIG. 2, it will be seen that a) the fluid exhibits negligible tensile stress with no applied electrical field, but
b) in the presence of an applied field stresses of the order of 8 to 9 kPa are sustainable over a 300 to 400% strain range.

From FIGS. 5 to 7, it will be seen that the fluid exhibits strikingly large compressive stress at applied electrical potentials and fields comparable to those used in conventional shear.

In particular, with a constant d.c. field, stresses of the order of 34 to 45 kPa are sustainable over an 80 to 30% strain range.

Other fluids which are similarly tested include the following particulate solids suspended in a silicone oil (such as C111/50; ICI): an organic ion-exchange resin, a particulate semiconductor material, eg a poly(acenequinone) radical or a polyaniline, and an ion exchanger aluminosilicate selected from those of the foregoing description.

EXAMPLE 2

Figure 8:
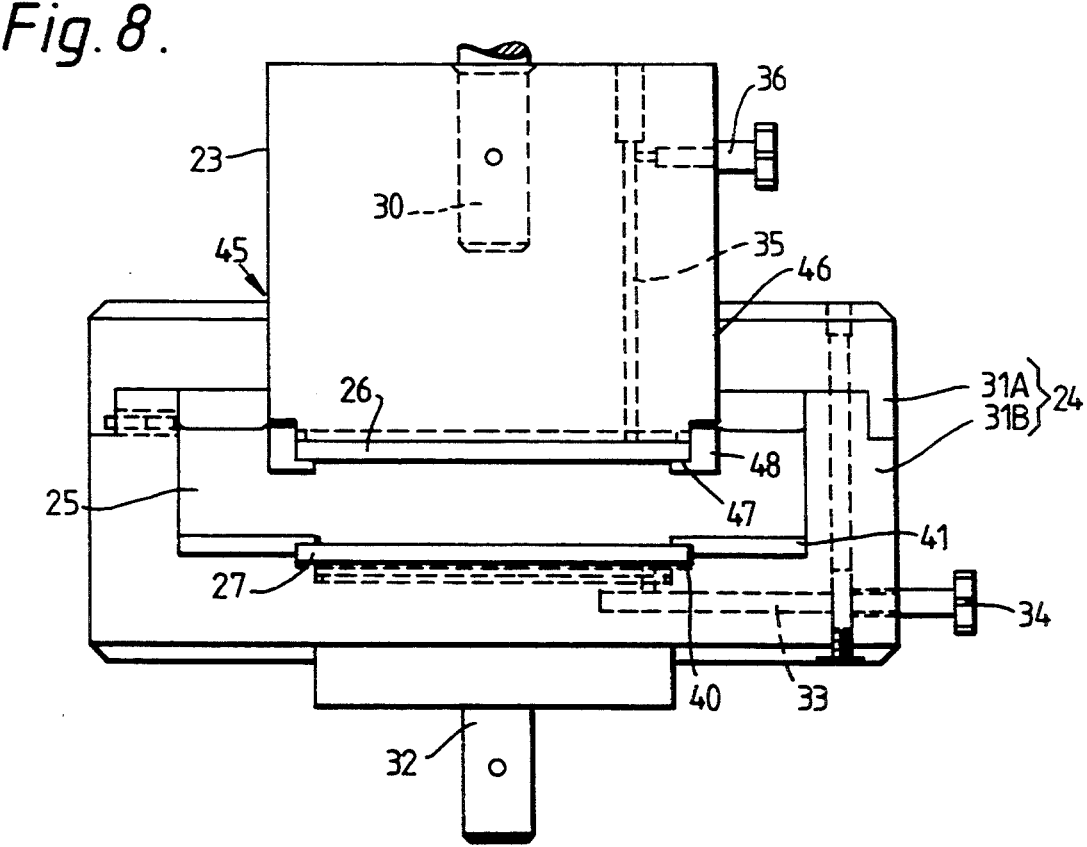
FIG. 8 is a cross-sectional view of a second embodiment of the electrorheological device of the present invention.

The apparatus is described generally in relation to FIG. 8.

In FIG. 8 the device 21 according to the present invention is in the form of a high voltage rheometer cell 22 comprising a cylindrical piston 23.

The piston 23 is slidably housed in the upper wall of a squat cylindrical chamber 24, capable of containing an electrorheological fluid 25 part of which will lie between two electrodes 26 and 27.

The device 21 has means 28 (here an industrial high voltage d.c. or a.c. supply, not shown) for applying an electrical potential between the electrodes 26 and 27.

The cell 22 is mounted in a conventional rheometer (Dartec 7670 servo-hydraulic test machine) 29 (not shown). In the rheometer 29, the chamber 24 is mounted on a lower arm 32 movable relative to a fixed stationary piston 23, which thus provides means for subjecting the fluid to varying compressive or tensile stress.

In operation of the rheometer 29, the fluid 25 may be squeezed out of or be admitted to the volume between the electrodes within the chamber 24.

In further detail, a stationary squat cylindrical bowl 31A with a lipped annular lid 31B, both of an insulative material (Delrin polyacetal, DuPont), form a squat and shallow cylindrical chamber 24, 140 mm in internal diameter and some 33 mm deep, which is fixed to a lower arm 32 of a rheometer (Dartec 7670 servo-hydraulic test machine) 29.

The circular floor of the chamber 24 contains a concentric or coaxial circular recess 40, which houses a sheet copper electrode 27, in the form of a disc 4 mm thick and 88 mm in diameter.

In the embodiment depicted in FIG. 8, the electrode 27 is partly housed in the recess 40, and partly by an overlaying flanged annulus 41, which is a push fit in the chamber 24 and screwed to the floor thereof, such that the exposed face of the electrode is 80 mm in diameter.

In an alternative embodiment (not shown), the electrode 27 is fully housed by the recess 40 and has a downwardly projecting coaxial threaded shank 42.

The shank 42 screws into a cooperating coaxial internally threaded socket 43 in the base of the recess 40.

This serves to fix the electrode 27 in the recess 40 flush with the floor of the chamber 24.

In either embodiment, an insulating coating 44 (not shown) of self-adhesive PVC 0.1 mm thick may cover the electrode when the device 21 is used with cyclically varying potentials, as mentioned hereinbefore.

From the electrode 27 in the cell 22 a copper wire 33 is mounted in and passes through the bowl 31 to a first terminal 34 which is connected to a first terminal of a high-tension voltage generator 28.

The piston 23 is mounted on the static load cell (shown in part only) of the rheometer 29, and is slidably housed within the central aperture 45 of the annular lid 35B of the chamber 24, and is of such overall diameter that a) the radial gap between the piston 23 and the circumferential wall 46 of the lid 35B of the chamber 24 is not airtight when the piston slides within the aperture 45 in operation of the cell 21, and b) the radial gap between the piston 23 and the circumferential wall 46 of the bowl 35A of the chamber 24 is 20 mm.

The piston 23 bears a sheet copper electrode 26 on its lower face, in the form of a disc 4 mm thick and 88 mm in diameter.

In the embodiment depicted in FIG. 8, the electrode 26 is housed in the recess 47 in an overlaying flanged annulus 48, which is a push fit on the piston 23 and screwed to the lower face thereof, such that the exposed electrode diameter is 80 mm.

In an alternative embodiment (not shown), the circular lower face of the piston 23 contains a concentric or coaxial circular recess 49, in which the copper electrode 26 is fully housed, and a coaxial internally threaded socket 51 in recess base.

The electrode 26 has an upwardly projecting coaxial threaded shank 50, which screws into the socket 51, and serves to fix the electrode 26 in the recess 49 flush with the lower face of the piston 23.

In either embodiment, an insulating coating 52 (not shown) of self-adhesive PVC 0.1 mm thick may cover the electrode when the device 21 is used with cyclically varying potentials, as mentioned hereinbefore.

From the electrode 26, a copper wire 35 passes to a second terminal 36 which is connected to a second terminal of the high-tension voltage generator 28.

The cell 22 is mounted in the rheometer 29 such that the rest position separation between the axial faces and of the electrodes 26 and 27 is 3 mm, regardless of the optional insulation on the electrodes 26 and 27 on the piston 23 and chamber 24 respectively.

The rheometer 29 has working parameters in the following ranges:

The rest position of the lower arm 32 may be moved towards or away from the static electrode 26 such that the stationary field gap between the electrodes 26 and 27 may vary within the range of 2 to 25 mm.

In use the lower arm 32 oscillates vertically, and the amplitude of the vibration may be set to vary dynamically at values between 0.2 and 25 mm (depending of course on the stationary field gap in the device), and the operational frequency may be set to values in the range of 0.03 to 100 Hz, for example 0.03 to 25 Hz.

The rate of strain may vary widely in operational conditions and is the parameter which overrides and largely determines the foregoing two parameters; typically it may lie in the range of 1 mm/min to 1,000 mm/sec.

In the present case the oscillations were set to be sinusoidal, but the oscillation wave-form may be set in a number of different wave-form options, eg saw-tooth, etc.

In addition to being subjected to a dynamically varying mechanical stress in the present device, the fluid may also be conventionally subjected to a fixed electrical potential difference between the electrodes, so that it will be electrically stressed by an electrical field varying in phase with the applied mechanical stress.

In such an embodiment, the applied field may typically be set between the charged electrodes 26 and 27 from 0.2 to 15, eg 0.5 to 8 kV mm$^{-1}$, and the corresponding applied field will be sinusoidally modulated under conditions of dynamic tension or compression.

In the present case, the fluid was tested at a constant amplitude (in this case ±1 mm), but at different frequencies from 0.1 to 10 Hz, and with a fixed d.c. potential of 4 kV between electrodes.

The potential applied by the generator 28 across the electrodes 26 and 27 was applied by a Trek 664 high-voltage power supply. The potential was monitored by an elecrostatic voltmeter 58 (not shown) across the terminals 34 and 36.

The stress on the fluid 25 was electrically sensed and transduced and the resultant output signal fed to an oscilloscope 59 (not shown).

The ER fluid between the two electrodes 26 and was a suspension in a 50 cSt dimethylsiloxane oil of a calcium-exchanged zeolite of mean particle size c. 5 $\mu$, and forming 50% w/w of the fluid.

The test results which were obtained are shown in the following Table.

TABLE

| Displacement frequency Hz | Peak pressure kPa |
|---|---|
| 0.1 | 11.74 |
| 0.5 | 10.15 |
| 1.0 | 10.15 |
| 2.0 | 12.33 |
| 3.0 | 14.27 |
| 4.0 | 18.05 |
| 5.0 | 20.29 |
| 6.0 | 21.39 |
| 7.0 | 21.68 |

In another test embodiment, a constant a.c. field is applied to the fluid 25 across the electrodes and 27 by an a.c. signal Generator. The potential may be held constant, or the device may be set so that the potential varies linearly with the applied oscillatory strain). In such latter case, the applied potential is regulated employing an LVDT 60 (not shown) between the piston electrode 26 and bowl electrode 27, the amplified output signal of the LVDT being used to drive the high voltage supply 28.

The device of the present invention has been described in relation to FIGS. 1 and 8 in the form of a tensile or compressive testing machine or a rheometer.

It will however be apparent to the skilled man that such a description applies generally to eg an automotive engine mounting damper.

In such a damper the lower fixed chamber 4 would be mounted on a chassis or front sub-frame, and the piston 3 would be mounted on part of the engine unit.

The cell 1 or 21 would be enclosed in a flexible boot.

The tensile/compressive mechanical stress on the mount would be the vibrational stress of the engine, rather than the controlled loading of the test rheometer.

A similar arrangement can be envisaged for an automotive suspension shock absorber or damper with a more axially elongate piston 23 and chamber 24, the former being mounted on a chassis or sub-frame and the latter on the movable suspension unit.

An asymmetric lever connecting the arm and the movable suspension members may be necessary in order to scale down the degree of movement of the piston 23 and/or to reverse the direction of mechanical stress conveniently.

The possibility of a using a bipolar series stack of electrodes to permit greater mutual movement of each pair of electrodes in such devices at moderate field strengths has been noted hereinbefore.

We claim:

1. An electrorheological device containing an electrorheological fluid which is subjected to varying compressive stresses in operation, comprising:
   a container having an opening and being constructed and arranged to contain said electrorheological fluid;
   a piston movable into said opening of said container to compress said electrorheological fluid within said container and thereby displace at least a portion of said fluid from said container, said piston being movable out of said container to thereby permit said displaced fluid to be reintroduced into said container;
   a first electrode disposed above said electrorheological fluid;
   a second electrode disposed below said electrorheological fluid; and
   means for applying an electrical potential between said electrodes to said electrorheological fluid.

2. A device according to claim 1, wherein:
   said container has an internal face, and said piston is mounted above said internal face to form a gap therebetween,
   said piston having a an end face opposite to said internal face of said container
   said piston being vertically movable such that when said piston moves downwardly toward said internal face of said container said electrorheological fluid is squeezed in said gap and when said piston moves upwardly away from said internal face.

3. A device according to claim 2, wherein:
   said container and said piston are cylindrical in form,
   said piston end face and said internal face of said container being parallel to each other.

4. A device according to claim 2, wherein: said first electrode is attached to said piston end face,
   said second electrode is attached to said internal face of said container.

5. A device according to claim 1, wherein one of said electrodes is attached to said piston and the other of said electrodes is attached to said container.

6. A device according to claim 1, wherein said means for applying an electrical potential applies a cyclically variable electrical potential.

7. A device according to claim 6, wherein said electrorheological fluid has a d.c. conductivity below $5 \times 10^{-1}$ ohm$^{-1}$.cm when said fluid is at a temperature of 25° C.

8. A device according to claim 1, further comprising means for varying the applied electrical potential between said electrodes so that said potential varies about earth potential in a sinusoidal wave-form.

9. A device according to claim 8, wherein the means for varying the applied potential applies a potential with frequencies in the range of 5 to 100 Hz.

10. A device according to claim 1 wherein at least one of the electrodes is insulated from the electrorheological fluid in use.

11. A mechanical system subject to resonant mechanical movement and including an electrorheological assembly which subjects an electrorheological fluid therein to varying compressive stresses in operation of said mechanical system, said electrorheological assembly comprising:
    containing means for containing said electrorheological fluid;
    a first electrode disposed above said electrorheological fluid;
    a second electrode disposed below said electrorheological fluid;
    means for applying an electrical potential between said electrodes to said electrorheological fluid; and
    means responsive to resonance from said mechanically resonant system for applying varying compressive stresses to said electrorheological fluid disposed above and below said electrorheological fluid.

12. A mechanical system according to claim 11, wherein:
    said containing means comprises a container having an upwardly facing opening and a piston positioned above said opening,
    said piston having a face opposite to an internal face of said container,
    said piston being vertically movable such that when said piston moves downwardly toward said internal face of said container said electrorheological fluid is squeezed therebetween and when said piston moves upwardly away from said internal face of said container said electrorheological fluid is admitted therebetween, and
    said means for applying varying compressive stresses including an upper member disposed above said electrorheological fluid and a lower member disposed below said electrorheological fluid.

13. A mechanical system according to claim 12, wherein:
    said container and said piston are cylindrical,
    said piston face and said internal face of said container being parallel to each other.

14. A mechanical system according to claim 12, wherein:
    said first electrode is attached to said piston, and
    said second electrode is attached to said internal face of said container.

15. A mechanical system according to claim 11, wherein said electrodes are each attached to opposite sides of said means for subjecting said electrorheological fluid to compressive stress.

16. A mechanical system according to claim 11, wherein said means for applying an electrical potential applies a cyclically variable electrical potential.

17. A mechanical system according to claim 16, wherein said electrorheological fluid has a d.c. conductivity below $5 \times 10^{-8}$ ohm$^{-1}$.cm$^{-1}$ when said fluid is at a temperature of 25° C.

18. A mechanical system according to claim 11, further comprising means for varying the applied electrical potential between said electrodes so that said potential varies about earth potential in a sinusoidal wave-form.

19. A mechanical system according to claim 18, wherein said means for varying the applied potential applies a potential which varies at a frequency in the range of 5 to 100 Hz.

20. A mechanical system according to claim 11, wherein at least one of said electrodes is insulated from said electrorheological fluid in use.

21. The invention according to claim 11, wherein the mechanical system comprises a shock absorber for an automobile.

22. The invention according to claim 11, wherein the mechanical system comprises an engine mount damper.

23. An electrorheological device being part of a mechanically resonant system, said electrorheological device having a resonant frequency tunable to dampen vibrations of said mechanically resonant system, said mechanically resonant system subjecting an electrorheological fluid in said electrorheological device to varying compressive stresses in operation, comprising:

containing means for containing said electrorheological fluid;

a first insulated electrode disposed above said electrorheological fluid;

a second insulated electrode disposed below said electrorheological fluid;

means for applying a cyclically variable electrical potential of a selected magnitude and frequency between said electrodes to said electrorheological fluid in order to adapt resonant characteristics of said electrorheological fluid to maximize the damping effects of said electrorheological fluid on said vibrations of said mechanically resonant system; and means for applying varying compressive stresses to said electrorheological fluid being disposed above and below said electrorheological fluid.

24. A device according to claim 23, wherein:

said containing means includes an open upwardly facing container having an internal face and a piston positioned above said internal face forming a gap therebetween, said piston having a face opposite to said internal face of said container, said piston being vertically movable such that when said piston moves downwardly toward said internal face of said container said electrorheological fluid is squeezed in said gap and when said piston moves upwardly away from said internal face of said container said electrorheological fluid is admitted into said gap, and said means for applying varying compressive stresses including an upper member disposed above said electrorheological fluid and a lower member disposed below said electrorheological fluid.

25. A device according to claim 24, wherein said container and said piston are cylindrical, said piston face and said internal face of said container being parallel to each other.

26. A device according to claim 24, wherein:

said first electrode is attached to said piston, and said second electrode is attached to said internal face of said container.

27. A mechanical system according to claim 23, wherein said electrodes are each attached to opposite sides of said means for subjecting said electrorheological fluid to compressive stress.

28. A device according to claim 23, wherein said electrorheological fluid has a d.c. conductivity below $5 \times 10^{-8} \text{ohm}^{-1}.\text{cm}^{-1}$ when said fluid is at a temperature of 25° C.

29. A device according to claim 23, wherein said means for applying a cyclically variable electrical potential between said electrodes applies a potential which varies about earth potential in a sinusoidal wave-form.

30. A device according to claim 23, wherein said means for applying a cyclically variable electrical potential between said electrodes applies a potential which varies at a frequency in the range of 5 to 100 Hz.

* * * * *